(12) United States Patent
Raszkowski et al.

(10) Patent No.: US 8,747,014 B2
(45) Date of Patent: Jun. 10, 2014

(54) TAPERED RETAINING RING TO REDUCE BEARING RACE MOVEMENT

(75) Inventors: James Raszkowski, Indianapolis, IN (US); James Redelman, Fillmore, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 622 days.

(21) Appl. No.: 12/351,220

(22) Filed: Jan. 9, 2009

(65) Prior Publication Data

US 2010/0178103 A1 Jul. 15, 2010

(51) Int. Cl.
*F16D 1/116* (2006.01)
(52) U.S. Cl.
USPC ......... 403/316; 403/372; 192/109 R; 384/561
(58) Field of Classification Search
USPC .......... 403/316–319, 372; 192/109 R, 110 B, 192/48.614; 384/903, 561
See application file for complete search history.

(56) References Cited

U.S. PATENT DOCUMENTS

| | | | | | |
|---|---|---|---|---|---|
| 2,509,081 | A | * | 5/1950 | Bluth et al. | 403/375 |
| 2,595,787 | A | * | 5/1952 | Heimann | 24/16 R |
| 3,017,006 | A | * | 1/1962 | Dence et al. | 192/113.35 |
| 4,019,824 | A | | 4/1977 | Percy | |
| 4,182,578 | A | * | 1/1980 | Livesay et al. | 403/317 |
| 4,411,346 | A | * | 10/1983 | Witt | 192/85.5 |
| 4,618,190 | A | * | 10/1986 | Garman et al. | 305/204 |
| 4,647,230 | A | * | 3/1987 | Friedrich et al. | 384/510 |
| 4,782,935 | A | * | 11/1988 | Gay et al. | 192/98 |
| 5,061,089 | A | | 10/1991 | Bair et al. | |
| 5,078,510 | A | | 1/1992 | Bair et al. | |
| 5,127,764 | A | * | 7/1992 | Baer | 403/316 |
| 5,971,621 | A | * | 10/1999 | Oyafuso et al. | 384/539 |
| 6,390,477 | B1 | | 5/2002 | Drago et al. | |
| 7,121,632 | B2 | * | 10/2006 | Grabaum | 301/105.1 |
| 7,210,853 | B2 | * | 5/2007 | Leimann | 384/571 |
| 7,459,811 | B2 | * | 12/2008 | Hyun | 310/23 |
| 2003/0070898 | A1 | | 4/2003 | Wolbers et al. | |
| 2005/0159227 | A1 | * | 7/2005 | Ouchi et al. | 464/178 |
| 2008/0078648 | A1 | | 4/2008 | Orlowski et al. | |
| 2008/0253710 | A1 | * | 10/2008 | Dodoro et al. | 384/548 |

FOREIGN PATENT DOCUMENTS

| | | |
|---|---|---|
| CN | 201027910 | 2/2008 |
| FR | 2897404 61 | 8/2007 |
| FR | 2912198 B1 | 8/2008 |
| JP | 07243450 A | 9/1995 |

OTHER PUBLICATIONS

VHO Housing Rings, pp. 52-55, extracted from Rotoclip.com Apr. 10, 2008 Catalog, retrieved Apr. 29, 2011 from http://web.archive.org/.*

(Continued)

*Primary Examiner* — Daniel P. Stodola
*Assistant Examiner* — Matthew R McMahon
(74) *Attorney, Agent, or Firm* — Barnes & Thornburg LLP

(57) ABSTRACT

An assembly comprises a shaft defining a longitudinal axis, a first component supported on the shaft, a second component supported on the shaft, and an isolator positioned between the first component and the second component. The second component configured such that the second component induces a force having a component parallel to the axis of the shaft. The force component parallel to the axis of the shaft induced by the second component is transferred directly to the shaft by the isolator and is isolated from the first component.

13 Claims, 5 Drawing Sheets

(56) References Cited

OTHER PUBLICATIONS

Tapered Section Retainer Rings brochure from www.rotoclip.com (102 pages).
PCT International Search Report and Written Opinion for PCT/US 10/20225, dated Mar. 9, 2010, which is related patent application (7 pages).
Supplementary European Search Report & Written Opinion for App. No. 10729446.4, dated Jul. 29, 2013, 6 pages.
Search Report & Written Opinion from State Intellectual Property Office of China for App. No. 201080007048.5, dated Feb. 25, 2013, 8 pages (English Translation).
Decision of Rejection from State Intellectual Property Office of China for App. No. 201080007048.5, dated Oct. 15, 2013, 8 pages (English Translation).

\* cited by examiner

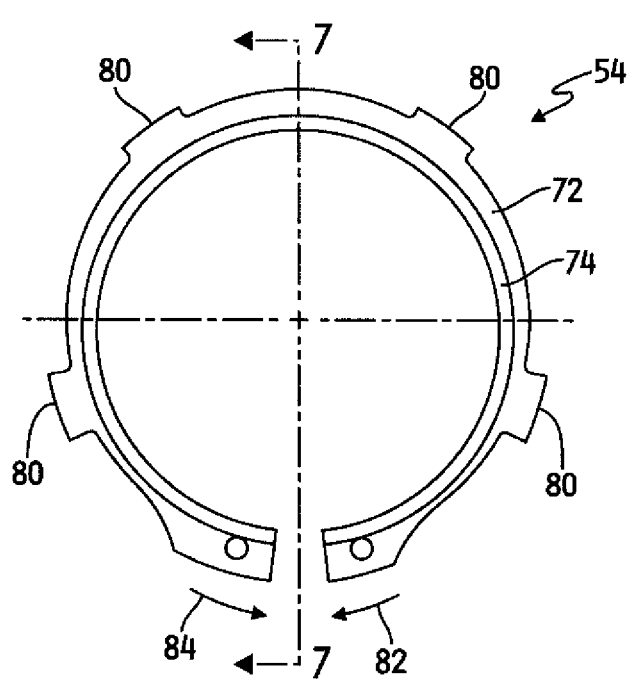
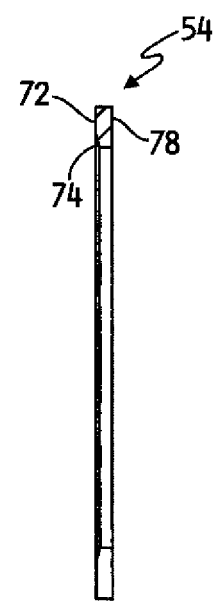
FIG. 6
FIG. 7

TAPERED RETAINING RING TO REDUCE BEARING RACE MOVEMENT

BACKGROUND OF THE INVENTION

The present disclosure is related to shaft assemblies having components mounted on a shaft and movable along the axis of the shaft. More specifically, the present disclosure is related to a shaft assembly having components mounted on the shaft that support radial and axial loads, the shaft configured so that the axial loads are transferred to the shaft.

Tapered retaining rings are used to remove axial endplay of components mounted on a shaft through an external ring. Tapered internal rings may be used inside a bore to reduce the endplay of components within the bore. Endplay refers to the movement of components mounted on a shaft or in a bore. Such movement occurs when the axial lengths of the components vary within a tolerance band. The stack-up of the tolerances results in a difference between the length of the stacked components and the distance between retainers used to hold the stacked components together. Such a difference results in unwanted movement of one or more of the components parallel to the longitudinal axis of the shaft or bore.

A shaft assembly within a transmission, for example, includes multiple components such as gears, clutches, and bearings. The components are mounted on the shaft and may have some freedom of movement along the shaft. An axial load is a load having a component parallel to the axis of the shaft. An axial load on one or more of the components tends to cause adjacent components to impart a force on one another. When endplay is present, the axial load may cause movement in the adjacent components, such as bearings, for example. Variation in the endplay of a bearing may tend to reduce the life of the bearing through excess load and heat.

SUMMARY OF THE INVENTION

The present application discloses one or more of the features recited in the appended claims and/or the following features which, alone or in any combination, may comprise patentable subject matter:

An assembly comprises a shaft, a first component supported on the shaft, a second component supported on the shaft, and an isolator positioned between the first and second components. The shaft defines a longitudinal axis and first and second ends. The second component is configured such that the second component induces a force in the assembly. The force induced in the assembly includes a component acting in a direction parallel to the axis of the shaft. The isolator is configured such that the force acting parallel to the axis of the shaft is transferred to the shaft.

In some embodiments, the shaft may define a groove having a first surface generally perpendicular to the longitudinal axis of the shaft. The groove may also include a second tapered surface opposing the first surface and oblique to the axis of the shaft such that the first and second surfaces form a tapered groove. In some embodiments, the isolator is removably engaged with the groove. The isolator may include a first face surface engaged with the first surface of the groove. The isolator may also include a second surface opposite the first surface. The second surface may be configured to engage a portion of the first component. The isolator may also include a tapered surface adjacent the second surface of the isolator, the tapered surface configured to engage the tapered surface of the groove.

The isolator may be biased such that the tapered surface of the isolator is urged against the tapered surface of the groove to fully seat the isolator in the groove. In some embodiments, the first component comprises a tapered roller bearing and the isolator positions the tapered roller bearing on the shaft. In some embodiments, the isolator comprises a tapered retaining ring.

In some embodiments, the second component is selectively lockable to the shaft such that the second component transitions between first and second states. In a first state the second component rotates about the shaft. In a second state the second component is locked to the shaft and rotates with the shaft. In some embodiments, the second component comprises a helical gear. The helical gear may develop a thrust force parallel to the longitudinal axis of the shaft.

Also, an assembly comprises a housing, a shaft including a longitudinal axis and first and second ends. The shaft may define a tapered groove. A first bearing supports the first end of the shaft on the housing and a second bearing supports the second end of the shaft on the housing. A helical gear is supported on the shaft. The helical gear is selectively lockable to the shaft. The helical gear transitions between a first state wherein the helical gear rotates about the shaft and a second state wherein the helical gear is locked to the shaft and rotates with the shaft. An isolator is positioned in the tapered groove in the shaft and positioned between the first bearing and the helical gear such that a thrust force developed by the helical gear is transferred directly to the shaft.

In some embodiments, the isolator comprises a tapered retaining ring. The retaining ring may include a tapered surface configured to engage a tapered surface of the groove in the shaft and the retaining ring is biased to urge the tapered surfaces together to seat the retaining ring in the groove. The tapered groove may define a first surface generally perpendicular to the longitudinal axis of the shaft and a second tapered surface opposing the first surface, the second tapered surface formed oblique to the longitudinal axis of the shaft.

The first surface of the groove may be positioned such that when the isolator is seated in the groove, the first bearing is positioned on the shaft such that the spacing between an inner race and an outer race of the first bearing is within the design limits of the bearing. In other embodiments, the isolator may include a tapered surface configured to engage a tapered surface of the groove. When the isolator includes the tapered surface, the isolator may be biased to urge the isolator into the groove to fully seat the isolator in the groove.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which:

FIG. 6 is an elevation view of an isolator used in the shaft assembly of FIG. 1; and FIG. 7 is a cross-section view of the isolator of FIG. 6 taken along lines 7-7.

DETAILED DESCRIPTION OF THE DRAWINGS

Figure 1:
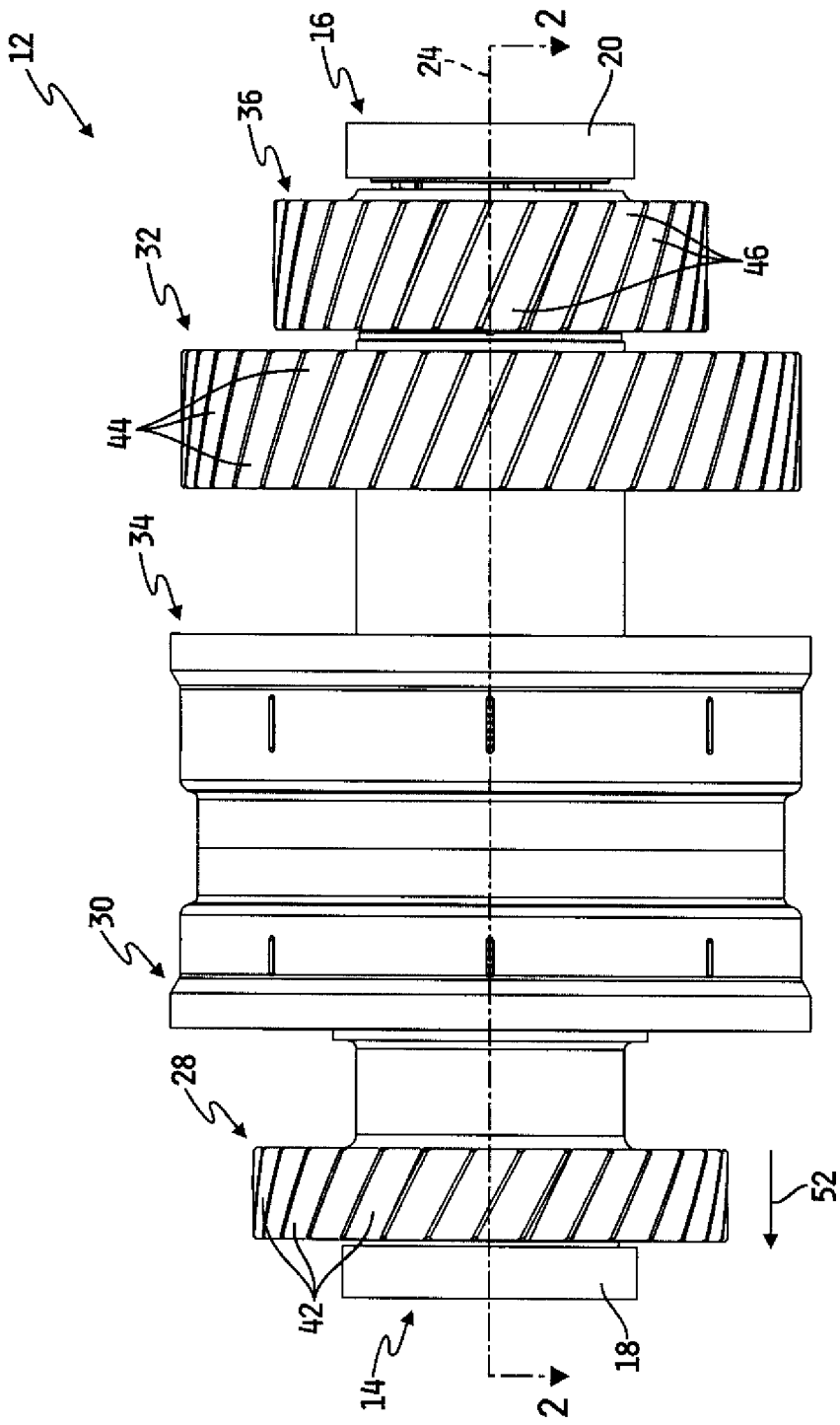
FIG. 1 is an elevation view of a shaft assembly according to the present disclosure.
Figure 2:
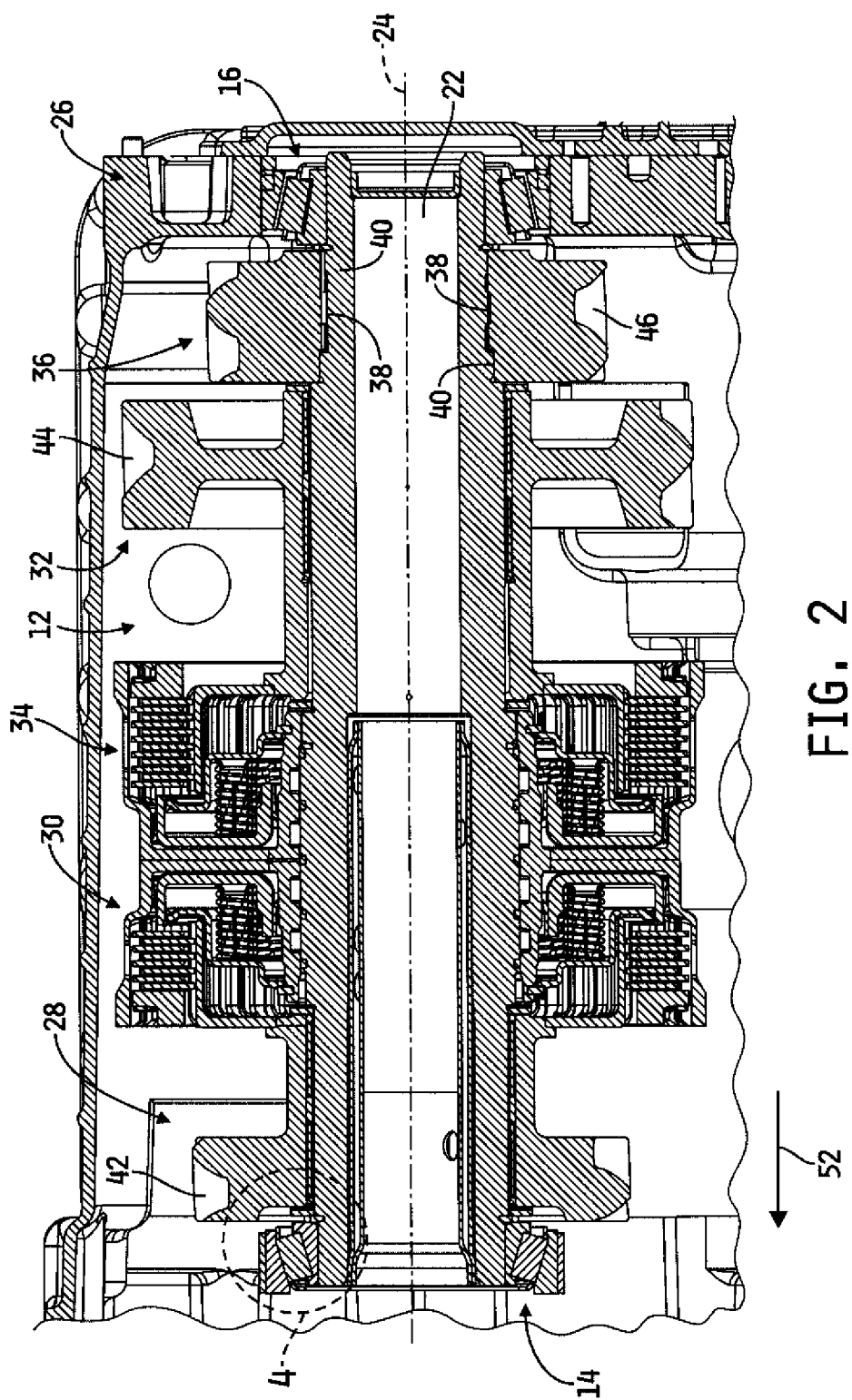
FIG. 2 is a cross-sectional view of the shaft assembly of FIG. 1, the shaft assembly positioned in a housing of an automatic transmission.

A shaft assembly 12 shown in FIG. 1 is illustratively configured to be supported in a housing 26 (seen in FIG. 2). The shaft assembly 12 includes, for example, two tapered roller bearings 14 and 16 engaged with the housing 26 to support a shaft 22 of the shaft assembly 12 for rotation about a longitudinal axis 24 relative to the housing. The bearings 14 and 16 each include outer races 18 and 20 respectively which are illustratively press fit into the housing 26 as shown in the cross-sectional view shown in FIG. 2. Illustratively, the shaft assembly 12 may be used in a multi-stage automatic transmission, for example.

Referring again to FIG. 1, a first component 28, illustratively embodied as a helical gear, is supported on the shaft 22. The helical gear 28 is coupled to a clutch assembly 30 which is operable to transition between a first state in which the gear 28 is free to rotate about the shaft 22 and a second state in which the gear 28 is locked to the shaft 22 to rotate with the shaft 22 about an axis 24 of the shaft 22. A second component 32, illustratively embodied as another helical gear, is coupled to a second clutch assembly 34. The clutch assembly 34 is operable to transition between a first state in which the gear 32 is free to rotate about the shaft 22 and a second state in which the gear 32 is locked to the shaft 22 and rotates with the shaft 22 about the axis 24. Yet another component 36 embodied as a helical gear is coupled to the shaft 22 and rotates with the shaft 22 about the axis 24. The gear 36 includes a plurality of internal splines 38 which are received on external splines 40 on the shaft 22 to transfer rotation of the shaft 22 to the gear 36.

Gear 28 has a number of helical teeth 42 which are configured to mesh with mating teeth of a complementary gear (not shown) to transfer rotation between the gear 28 and the complementary gear. For example, in some embodiments the gear 36 may receive torque from a complementary component. Because gear 36 is fixed to shaft 22, the torque is thereby transferred through gear 36 to shaft 22. Activation of clutch assembly 30 results in gear 28 being locked to shaft 22 such that torque is transferred from the shaft 22 to the gear 28. In the illustrative embodiment, gear 28 has a diameter that is greater than the diameter of the gear 36. Rotation of gear 36 having a smaller diameter than the larger gear 28 results in a lower output speed at the teeth of gear 28.

Similarly, gear 32 also has helical teeth 44 and gear 36 has teeth 46. In the illustrative embodiment, activation of clutch 34 results in rotation being transferred from shaft 22 to gear 32. Gear 32 has a larger diameter than gear 28. The larger diameter of gear 32 results in an even lower output speed at the teeth 44 when gear 32 is driven by gear 36. Thus, shaft assembly 12 may be used in an automatic transmission to transfer between a low range output when clutch 34 is activated and a high range output when clutch 30 is activated.

Figure 3:
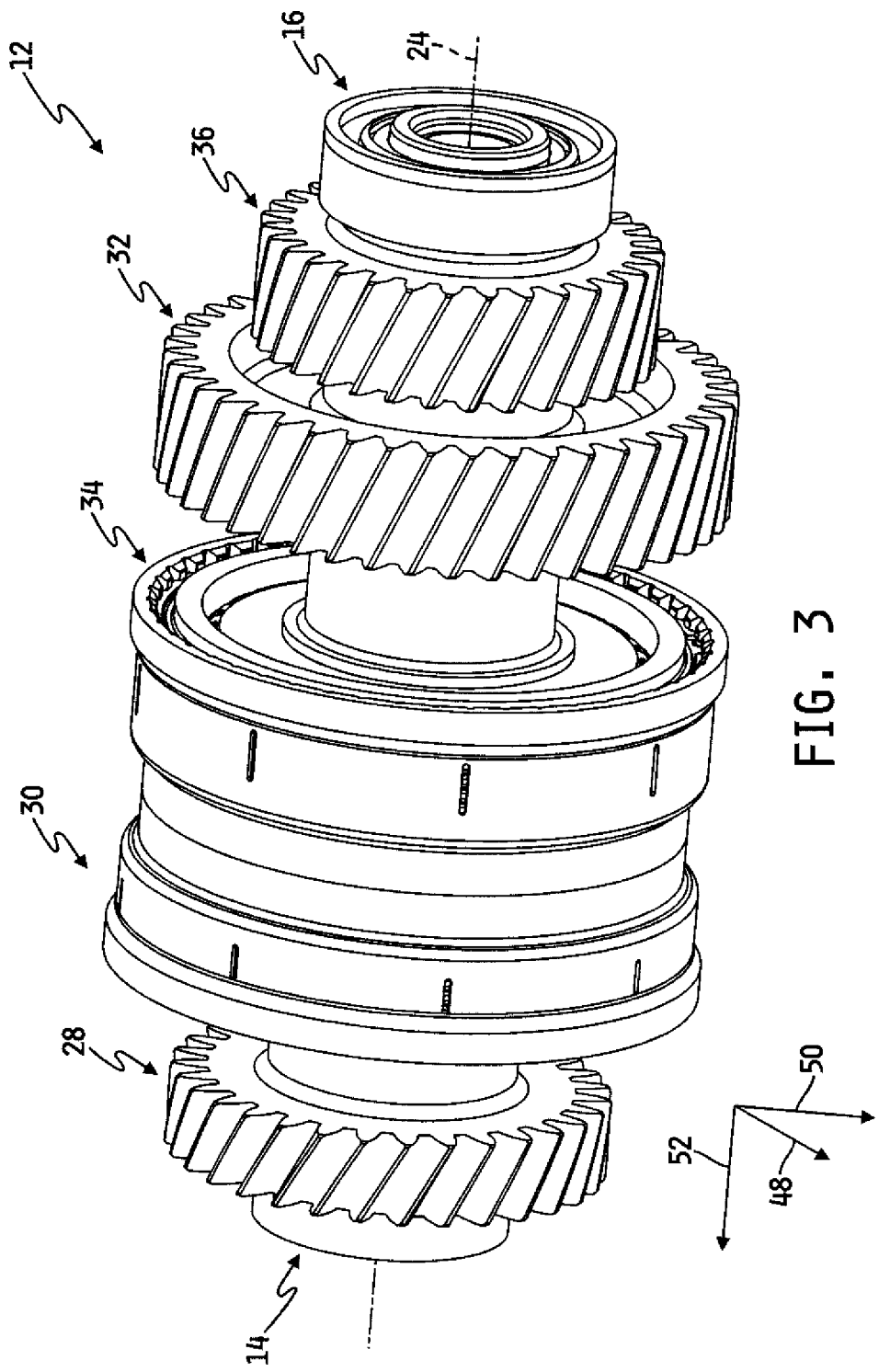
FIG. 3 is a perspective view of the shaft assembly of FIG. 1.

It is known that the use of helical gear teeth, such as the teeth 42, 44, and 46 of gears 28, 32, and 36 respectively results in reduced noise due to reduced impact as compared to a traditional straight-toothed spur gear. However, the helical aspect of the teeth 42, 44, and 46 results in a load being induced in the gears in a direction parallel to the axis of rotation of the gears 28, 32, and 36. In the illustrative embodiment, the axis of rotation of the gears 28, 32 and 36 is coincident with the axis 24 of the shaft 22. The transfer of torque between the gears 28, 32, and 36 and complementary gears induces a force 48 to the teeth of the gears 28, 32 and 36 having a first force component 50 perpendicular to the axis 24 and a second force component 52 parallel to the axis 24 as illustrated in FIG. 3. The second force component 52 is an incidental force that is a result of the use of a helical gear tooth profile.

It should be understood that the magnitude of the incidental force component 52 will vary depending on the amount of torque being transferred and the angle of the helical teeth, among other things. The force perpendicular to shaft 22 is transferred through the shaft assembly 12 as torque is transferred. The incidental force component, referred to hereinafter as a thrust load, must be reacted by components along the length of the shaft assembly 12. In other words, the thrust force 52 is transferred through the components supported on the shaft 22 until a reaction is supported in the assembly. In some situations, the thrust load has been born by tapered roller bearings positioned at either end of a shaft assembly. Tapered roller bearings are configured to support both a thrust load as well as supporting a shaft for rotation. The selection of the appropriate size of tapered roller bearing is partially dependent upon the magnitude of the thrust load applied to the bearing. Excessive thrust load applied to the bearing induces losses in the assembly by increasing the normal load on the bearing components, thereby increasing the friction forces in the bearing. For example, if an inner race 56 of bearing 14 is movable on the shaft 22, endplay will be reduced and loads on the bearing 14 may increase. The losses are typically converted to heat which reduces the life of the bearing and the efficiency of the assembly.

In the illustrative embodiment, the thrust load 52 is not applied to the thrust bearings 14 and 16. The thrust load 52 is reacted to the shaft 22 by the use of an isolator 54, illustratively embodied as a retaining ring 54 secured to the shaft 22 and positioned to transfer the thrust load 52 directly to the shaft 22. While in the illustrative embodiment a retaining ring is used as an isolator, those of ordinary skill in the art will readily recognize that various components may be employed as the isolator within the scope and spirit of this disclosure. For example, a circlip, a snap-ring, an e-ring, a radial grip ring, a crescent ring, a clipring or other similar product may form at least a portion of an isolator within the scope of this disclosure as described in more detail below.

Figure 4:
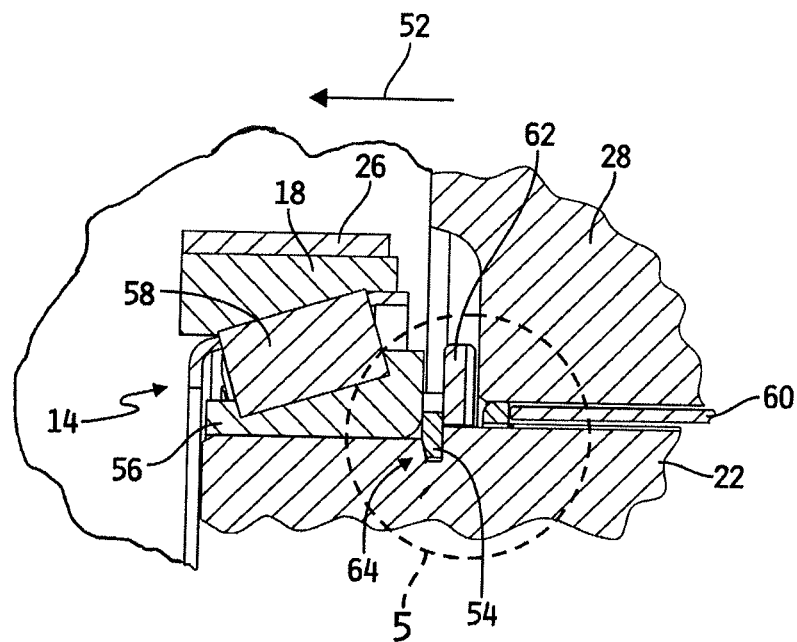
FIG. 4 is an enlarged view of a portion of the cross-section of FIG. 2.

Referring now to FIG. 4, the use of the retaining ring 54 is shown with respect to gear 28. As shown in FIG. 4, gear 28 is supported on a plurality of needle bearings 60 for rotation with respect to the shaft 22. The tapered roller bearing 14 is positioned with the outer race 18 engaged with the housing 26. A plurality of rollers 58 is positioned between the outer race 18 and an inner race 56 so that the races 18 and 56 may move relative to one another. The isolator, illustratively embodied as the retaining ring 54 is positioned adjacent the inner race 56 and is secured to the shaft 22 by engaging a groove 64 formed in the shaft 22. A thrust washer 62 is interposed between the retaining ring 54 and the gear 28 such that when the gear 28 rotates relative to the shaft 22, the thrust washer 62 acts as a bearing between the gear 28 and the retaining ring 54. When the gear 28 is locked to the shaft 22 by the clutch 30, there is little or no rotation of the gear 28 relative to the retaining ring 54 because both the gear 28 and retaining ring 54 moves with the shaft 22 as the shaft 22 rotates.

Figure 5:
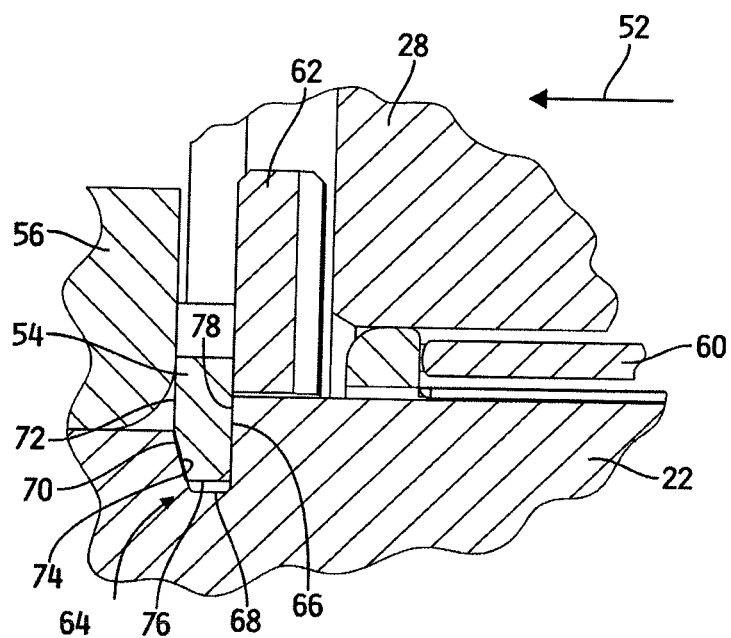
FIG. 5 is a still further enlarged view of a portion of the cross-section of FIG. 2.

The spacing between the inner race 56 and outer race 18 of bearing 14 is controlled so that the operation of the bearing 14 is optimized. As shown in FIG. 5, groove 64 is positioned so that the retaining ring 54 engages the inner race 56 to control the position of the inner race 56 on the shaft 22. The retaining ring 54 is also positioned such that the thrust load 52 is received by the retaining ring 54 and not transferred directly to the inner race 56. This permits an appropriate endplay spacing between the races 56 and 18 to be maintained as designed in contrast to having the thrust load 52 applied to the inner race 56 which may tend to move the race 56 along the shaft 22 and change the spacing. Thus, retaining ring 54 positions the inner race 56 and isolates the inner race 56 from the thrust load 52.

The groove 64 includes a wall 66 that is substantially perpendicular to the axis 24 of shaft 22. A second wall 70 opposing the wall 66 is at an angle oblique to the axis 24 of the shaft 22. A groove bottom 68 interconnects the walls 66 and 70. The retaining ring 54 is formed to include first and second face surfaces 78 and 72 respectively. An oblique surface 74 is formed along an inner periphery of the retaining ring 54 as shown in FIG. 6. Referring again to FIG. 5, when retaining ring 54 is positioned in the groove 64, the oblique surface 74 engages the surface 70 of the groove 64. The retaining ring 54 is biased in the direction of arrows 82 and 84 to the configuration shown in FIG. 6. When the retaining ring 54 is inserted in groove 64, the bias of the retaining ring 54 causes the ring 54 to seat with the surfaces 78 and 74 of the retaining ring 54 engaged with the surfaces 66 and 70 of the groove 64, respectively.

It should be noted that in a typical retaining ring application, the groove would be produced with two parallel walls spaced apart by the thickness of the retaining ring. Manufacturing variances in the position between the walls and the thickness of the retaining ring may result in the retaining ring being movable in the groove along the axis of the shaft. Thus, a thrust load applied to the retaining ring would displace the retaining ring and transfer the thrust load through the retaining ring to an adjacent component, such as an inner race of a bearing, for example. In the illustrative embodiment, the tapered retaining ring 54 seats against the surfaces 66 and 70 with some variation in the position of surface 70. Once the retaining ring 54 is seated it will not move along the axis 24 of the shaft 22. Thus, the retaining ring 54 acts as a rigid isolator between the thrust loaded gear 28 and the inner bearing race 56. The spacing of the bearing races 56 and 18 is maintained as designed and the thrust load 52 is reacted to the shaft 22 and not the bearing 14.

As can be seen in FIG. 6, retaining ring 54 includes a number of extensions 80 about the outer periphery of the retaining ring 54. The extensions 80 provide additional surface area to act against the bearing race 56 and the thrust washer 62 without increasing the rigidity of the retaining ring 54 when the retaining ring 54 is deflected to be placed on the shaft 22. The risk of damage to the retaining ring 54 is thereby reduced as the bending stress induced in the retaining ring 54 during installation is minimized.

While the present disclosure has focused on an embodiment of a shaft assembly having external components, those of ordinary skill in the art will recognize the applicability of the tapered retaining ring in related assemblies. For example, a retaining ring having a tapered surface on an outer periphery and extensions positioned on the inner periphery may be used in an internal bore to position components and isolate thrust forces in the bore. The use of the tapered aspect of the retaining ring to both position the retaining ring and permit the retaining ring to be fully seated to act as a thrust load isolator provides a reduction in manufacturing costs, improved reliability, and reduction in the cost of components by controlling the loading of the tapered roller bearings.

Although certain illustrative embodiments have been described in detail above, variations and modifications exist within the scope and spirit of this disclosure as described and as defined in the following claims.

The invention claimed is:

1. An assembly comprising
a shaft defining a longitudinal axis and a tapered groove that includes a first surface generally perpendicular to the longitudinal axis of the shaft and a second surface opposing the first surface, the second surface formed oblique to the longitudinal axis of the shaft,
a first component supported on the shaft,
a second component supported on the shaft, the second component configured such that during operation of the assembly a force normal to the longitudinal axis of the shaft is converted by the second component such that the second component induces a force having a component parallel to the axis of the shaft, and
an isolator having first and second sides and an inner diameter, the isolator positioned in the tapered groove between the first component and the second component with a portion of the first side at a perimeter of the inner diameter in contact with the first surface of the groove and a portion of the second side at the perimeter of the inner diameter in contact with the second surface of the groove such that the force component parallel to the axis of the shaft induced by the second component is transferred directly to the shaft by the isolator and is isolated from the first component;
wherein the isolator is removably engaged with the groove; and
wherein the isolator is biased to urge the second side of the isolator against the second surface of the groove to fully seat the isolator in the groove.

2. The assembly of claim 1, wherein the first component comprises a tapered roller bearing and the isolator positions the tapered roller bearing on the shaft.

3. The assembly of claim 2, wherein the isolator comprises a tapered retaining ring.

4. The assembly of claim 3, wherein the second component comprises a helical gear.

5. The assembly of claim 4, wherein the second component is selectively lockable to the shaft such that the assembly transitions between a first state wherein the second component rotates about the shaft and a second state wherein the second component is locked to the shaft to rotate with the shaft.

6. The assembly of claim 1, wherein the second component is selectively lockable to the shaft such that the assembly transitions between a first state wherein the second component rotates about the shaft and a second state wherein the second component is locked to the shaft and rotates with the shaft.

7. The assembly of claim 6, wherein the isolator comprises a tapered retaining ring fully seated in the tapered groove.

8. The assembly of claim 6, wherein the assembly further comprises a housing, a first bearing supporting a first end of the shaft on the housing, a second bearing supporting a second end of the shaft on the housing and the isolator positions one of the first and second bearings on the shaft.

9. The assembly of claim 8, wherein the isolator comprises a tapered retaining ring fully seated in the tapered groove.

10. An assembly comprising,
a housing,
a shaft defining a longitudinal axis and a tapered groove,
a first bearing supporting a first end of the shaft on the housing, a second bearing supporting a second end of the shaft on the housing, a helical gear supported on the shaft, the helical gear selectively lockable to the shaft such that the assembly transitions between a first state in which the helical gear rotates about the shaft and a second state in which the helical gear is locked to the shaft and rotates with the shaft, and an isolator having first and second sides and an inner diameter, the isolator positioned in the tapered groove with a portion of the first and second sides at the inner diameter in contact with the groove between the first bearing and the helical gear such that a thrust force developed by the helical gear is transferred by the isolator directly to the shaft and is isolated by the isolator from the first bearing;

wherein the isolator comprises a tapered retaining ring; and wherein the retaining ring defines a tapered surface configured to engage a tapered surface of the groove in the shaft and the retaining ring is biased to urge the tapered surfaces of the retaining ring and the tapered groove together to seat the retaining ring in the groove.

11. The assembly of claim 10, wherein the tapered groove defines a first surface generally perpendicular to the longitudinal axis of the shaft and a second tapered surface opposing the first surface, the second tapered surface formed oblique to the longitudinal axis of the shaft.

12. The assembly of claim 11, wherein the first surface of the groove is positioned such that when the isolator is seated in the groove, the first bearing is positioned on the shaft such that a spacing between an inner race and an outer race of the first bearing is controlled.

13. An assembly comprising, a housing, a shaft defining a longitudinal axis and a tapered groove, a first bearing supporting a first end of the shaft on the housing, a second bearing supporting a second end of the shaft on the housing, a helical gear supported on the shaft, the helical gear selectively lockable to the shaft such that the assembly transitions between a first state in which the helical gear rotates about the shaft and a second state in which the helical gear is locked to the shaft and rotates with the shaft, and an isolator having first and second sides and an inner diameter, the isolator positioned in the tapered groove with a portion of the first and second sides at the inner diameter in contact with the groove between the first bearing and the helical gear such that a thrust force developed by the helical gear is transferred by the isolator directly to the shaft and is isolated by the isolator from the first bearing;

wherein the tapered groove defines a first surface generally perpendicular to the longitudinal axis of the shaft and a second tapered surface opposing the first surface, the second tapered surface formed oblique to the longitudinal axis of the shaft; and wherein the isolator defines a tapered surface configured to engage a tapered surface of the groove and wherein the isolator is biased to urge the isolator into the groove to fully seat the isolator in the groove.

\* \* \* \* \*